US011868236B2

(12) United States Patent
A et al.

(10) Patent No.: US 11,868,236 B2
(45) Date of Patent: Jan. 9, 2024

(54) METHODS AND SYSTEMS FOR CLASSIFYING APPLICATION-SPECIFIC CRASH REPORTS USING APPLICATION-AGNOSTIC MACHINE LEARNING MODELS

(71) Applicant: INTUIT INC., Mountain View, CA (US)

(72) Inventors: Sudhindra A, Bangalore (IN); Sri Aurobindo Munagala, Bangalore (IN)

(73) Assignee: INTUIT INC., Mountain View, CA (US)

(*) Notice: Subject to any disclaimer, the term of this patent is extended or adjusted under 35 U.S.C. 154(b) by 303 days.

(21) Appl. No.: 17/386,358

(22) Filed: Jul. 27, 2021

(65) Prior Publication Data
US 2023/0033084 A1 Feb. 2, 2023

(51) Int. Cl.
*G06F 11/36* (2006.01)
*G06F 11/07* (2006.01)

(52) U.S. Cl.
CPC ........ *G06F 11/366* (2013.01); *G06F 11/0706* (2013.01); *G06F 11/0793* (2013.01)

(58) Field of Classification Search
CPC ............... G06F 11/0706; G06F 11/079; G06F 11/0793; G06F 11/366
See application file for complete search history.

(56) References Cited

U.S. PATENT DOCUMENTS

| 11,099,928 | B1* | 8/2021 | Vah ........................ G06N 3/044 |
| 2022/0121981 | A1* | 4/2022 | Chaudhuri ............ G06F 11/004 |
| 2022/0261301 | A1* | 8/2022 | Philip .................. G06F 11/3688 |

OTHER PUBLICATIONS

Roman Vasiliev, et al., "TraceSim: A Method for Calculating Stack Trace Similarity," arXiv:2009.12590v1 [cs.SE] Sep. 26, 2020, <https://arxiv.org/abs/2009.12590>, 6 pages.

* cited by examiner

*Primary Examiner* — Joseph R Kudirka
(74) *Attorney, Agent, or Firm* — Patterson + Sheridan, LLP

(57) ABSTRACT

Certain aspects of the present disclosure provide techniques for handling crash events in a software application using application-agnostic machine learning models. An example method generally includes receiving a data set of crash reports from a software application for analysis. Using a first neural network, a representation of each respective crash report in the data set is generated. The data set of crash reports and a mapping between functions in the software application and a multidimensional space are input into the first neural network. Each respective crash report in the data set is classified using a second neural network and the representation of each crash report in the data set. One or more actions are taken with respect to the software application based on the classifying each respective crash report in the data set.

20 Claims, 6 Drawing Sheets

300 ⟶

| Stackframe | Mapped Point |
|---|---|
| qbtool32!CSort::GetComponentID | [ 1000, 1100, 1101 ] |
| paycore!PayrollFormList::GetFormInfoByFormId | [ 2000, 2100, 2101 ] |
| PAYUTIL!SavedFilingListCtrl::PopulateSavedFilingVector | [ 3000, 3100, 3101 ] |
| PAYUTIL!CDashPayFormsHistory::SavedFilingSubFormProc | [ 3000, 3200, 3201 ] |

FIG. 3

METHODS AND SYSTEMS FOR CLASSIFYING APPLICATION-SPECIFIC CRASH REPORTS USING APPLICATION-AGNOSTIC MACHINE LEARNING MODELS

INTRODUCTION

Aspects of the present disclosure relate to the development and maintenance of software applications, and more specifically to machine learning models used in classifying and identifying defects in a software application.

BACKGROUND

Software applications generally include multiple components that may be compiled into a binary (or other package) and deployed onto one or more computing systems for use in a production environment. Prior to deployment into the production environment, a software application may be tested in order to ensure that the application operates as expected and to rectify errors discovered during the testing process. The testing process may execute a suite of tests, which may generally represent or otherwise replicate various scenarios expected to be executed by users of the software application during runtime, to determine whether the software application operates as expected. When the suite of tests are successfully completed, the software application may be compiled and deployed into the production environment.

Testing an application in a development environment using a suite of tests may result in common execution paths within the application being tested. However, uncommon execution paths may not always be tested, and the application may also encounter inputs or other actions in tested paths that also were not validated during testing. Thus, an application may not be guaranteed to work properly, despite having been tested prior to deployment to a production environment.

Regardless of whether an application encounters errors in a testing environment or in a production environment, these errors generally result in the generation of stack traces. Generally, these stack traces include information about the state of an application prior to encountering the error. This information may be used by developers to identify locations within the application at which errors occur during application execution, which may allow developers to focus their attention on addressing code errors in the code associated with the identified locations within the application. However, stack traces may differ for each instance of an error encountered during execution of an application, which may complicate the process of identifying errors and determining how to prioritize addressing errors that exist within a software application.

Machine learning models can be used to analyze stack traces to determine similarities between different crash reports. However, while applications may share some common components, such as shared libraries of functional and/or graphical user interface components, a significant portion of the components in one software application will generally differ significantly from the components in another software application. Thus, unique machine learning models may be needed to analyze crashes for different applications and identify components within these applications that need additional development in order to rectify defects in these applications. Training and maintaining unique machine learning models for each of a plurality of applications, however, may be a resource-intensive and otherwise impractical process.

Thus, techniques are needed for improvements using machine learning models in analyzing stack traces generated during execution of a software application.

BRIEF SUMMARY

Certain embodiments provide a computer-implemented method for handling crash events in a software application using application-agnostic machine learning models. An example method generally includes receiving a data set of crash reports from a software application for analysis. Using a first neural network, a representation of each respective crash report in the data set is generated. The data set of crash reports and a mapping between functions in the software application and a multidimensional space are input into the first neural network. Each respective crash report in the data set is classified using a second neural network and the representation of each crash report in the data set. One or more actions are taken with respect to the software application based on the classifying each respective crash report in the data set.

Still further embodiments provide a computer-implemented method for training an application-agnostic machine learning model to handle crash events in one of a plurality of software applications. An example method generally includes receiving a data set of crash reports from a software application. A crash embedding is generated, and the crash embedding generally includes a mapping between functions in the software application and a multidimensional space. A first neural network is trained to generate a latent space representation of a crash report based on the received data set of crash reports and the crash embedding. A second neural network is trained to classify crash reports based on latent space representations generated by the first neural network for the received data set of crash reports such that the second neural network is configured to classify crash reports for any of a plurality of software applications.

Other embodiments provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

FIG. 3 illustrates an example mapping between functions invoked in an application and a multidimensional space used in classifying crash reports.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
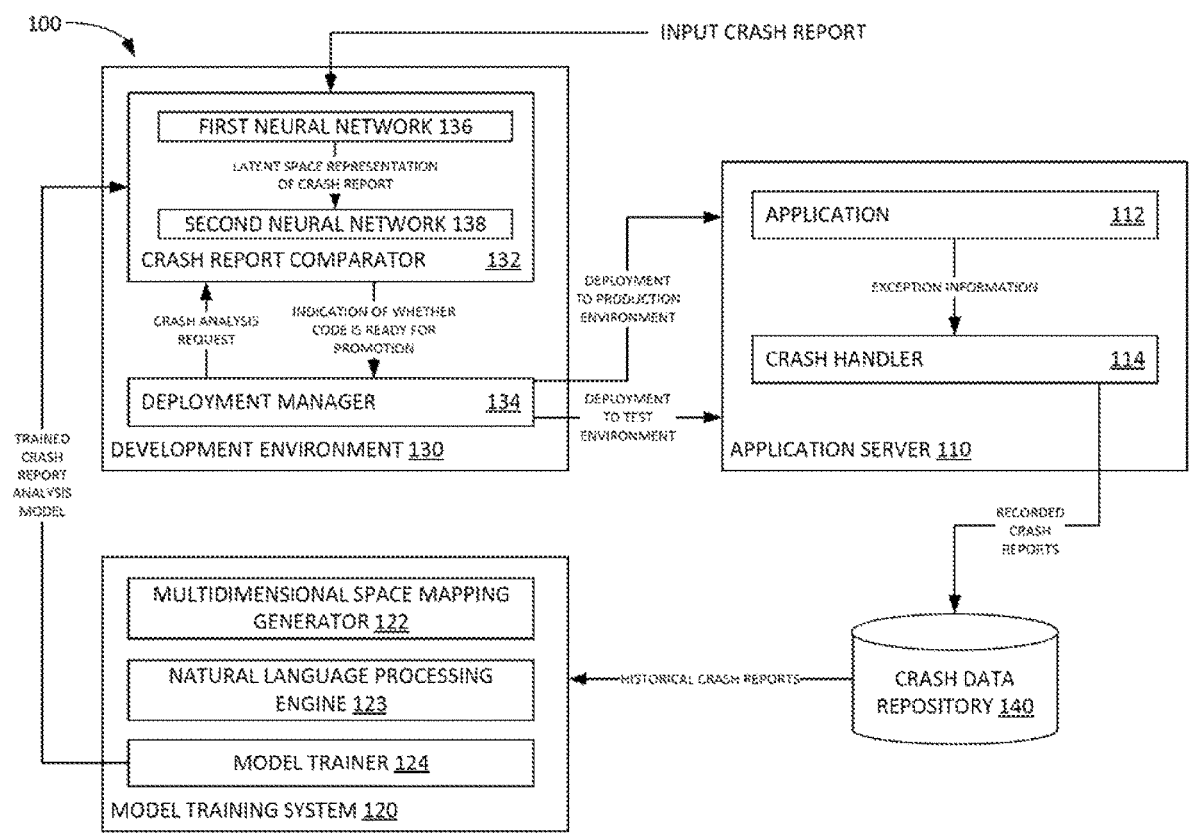
FIG. 1 depicts an example computing environment in which crash reports are classified using an application-agnostic machine learning model, and in which crashes in software applications are handled based on the classifications of the crash reports.

Errors are encountered in software applications throughout the lifecycle of an application. Many errors may be caught through executing a software application in a testing environment prior to deployment to a production environment. For example, in traditional software deployment schemes in which an application is delivered through downloads or physical media, application binaries can be "released to manufacturing" or "released to production" after the software application passes verification tests performed against the software application in a test environment. In continuous integration/continuous deployment (CI/CD) pipelines, new versions of application components can be pushed to a production environment (e.g., a cloud compute environment in which the software application is hosted for use by multiple users) when those components pass various validation tests. However, validation testing may not identify all possible errors in a software application, and thus, errors may arise during execution of the software application in the production environment.

To obtain intelligence about errors and determine which errors to prioritize, various techniques can be used. Generally, security-related errors, which may not cause an application to fail, but which potentially expose sensitive information or allow for the exfiltration of sensitive information, may be prioritized based on reports from security firms, penetration tests, "white hat" hackers, or the like. Errors that cause an application to fail—whether handled (e.g., errors from which application execution may be continued) or unhandled (e.g., errors causing an application to terminate)—may be prioritized for resolution based on varying metrics, such as seriousness (e.g., whether the error caused the application to fail gracefully (e.g., such that the application continues to execute or terminates while leaving data in a known state) or fail hard (e.g., such that execution of the application terminates), a number of users affected by a particular error, or the like. However, error reports may identify a location of the error in a software application, but may not include other information that may be useful in determining why the error occurred or a frequency at which particular actions caused the error to occur.

In some cases, machine learning models may be used to analyze crash reports generated during execution of an application. Generally, a machine learning model may be trained based on a universe of historical crash reports to facilitate classification of crash reports and management of a software application based on the classification of crash reports. While machine learning models may allow for crash reports to be analyzed and for similarities between different crashes to be identified (e.g., via clustering, similarity scores, etc.), machine learning models are generally trained to analyze crashes within a single application. Each application generally has a unique set of functions and modules that are identified in stack traces associated with crash reports generated during execution of that specific application (and not associated with crash reports generated during execution of other applications). Thus, in an environment in which multiple applications are maintained, multiple machine learning models may need to be maintained in order to analyze crash reports for each of these applications. Maintaining multiple machine learning models may be a resource-intensive process, as training and re-training each machine learning model may use a significant amount of processing time, memory, network bandwidth, power, and other computing resources.

Aspects of the present disclosure use application-agnostic machine learning models to analyze crash reports generated by one of a plurality of applications and identify groups of similar crashes from an input data set of crash reports. By using application-agnostic machine learning models, which (as discussed in further detail below) analyze crashes based on mappings of application-specific information to a multidimensional space decoupled from specific information about the application that generated these crashes, a single machine learning model can be used and deployed to analyze crashes from multiple applications. Software development systems can more quickly and accurately identify similar errors generated during execution of any of a plurality of software application. Further, latent similarities between errors may be identified where the stack traces do not explicitly reveal those similarities (e.g., due to order-dependent differences between stack traces across different crash reports). Thus, the computing system can take various actions to improve the quality of software applications deployed to a production environment, such as blocking deployment of the software application to a production environment until these errors are resolved, flagging areas in source code that are regularly identified in error reports as being associated with error reports, and the like. This may improve the stability of software applications developed and deployed in various environments, reduce memory or storage usage for crash reports, and reduce processing time spent handling errors within a software application. Further, by using a single, application-agnostic machine learning model to analyze crashes from a plurality of software applications, aspects of the present disclosure may also reduce the amount of processing time, memory, power, and other computing resources used in training and maintaining machine learning models to analyze crash reports as compared to using dedicated, application-specific machine learning models to analyze crash reports in a specific application.

Example Application-Specific Crash Report
Classification Using Application Agnostic Machine
Learning Models FIG. 1 illustrates an example computing environment 100 in which application-agnostic machine learning models are trained and used to classify crash reports and handle crash events in a software application based on crash similarity metrics, in accordance with certain aspects of the present disclosure. Generally, a crash event may be represented by an exception (whether handled or unhandled) or other situations in which an application fails to execute as expected. As illustrated, computing environment 100 includes an application server 110, model training system 120, development environment 130, and crash data repository 140.

Application server 110 is generally representative of one or more physical or virtual computing devices on which an application may be executed and crash events during execution of the application may be recorded. Application server 110 may host a test environment and a production environment in which different versions of an application may be hosted. In some aspects, the test environment may be hosted on a first set of resources on the application server 110, and the production environment may be hosted on a second set of resources on the application server 110. For example, the test environment and the production environment may be hosted on different virtual machines, in different containers in a containerized execution environment, or the like. As illustrated, application execution environment includes an application 112 and a crash handler 114.

Application 112 generally represents an application that is deployed for execution with the test and/or production environments on application server 110. While application 112 is illustrated as executing on an application server 110, it should be recognized that application 112 in other embodiments can execute on mobile devices, wearable devices, or other computing devices on which applications can be deployed and executed. Generally, application 112 may expose various interfaces through which users of the application can invoke application functionality, cause the application to communicate with remote resources, and the like. Application 112 may include code that allows the application 112 to fail in a controlled manner when crash events are encountered during execution. However, not all crash events that may arise within application 112 may be handled to cause the application 112 to fail in a controlled manner, and thus, application 112 may fail in an uncontrolled manner.

Crash handler 114 generally monitors the execution state of application 112 and handles crash event recording and recovery when crash events are encountered during the execution of application 112 on application server 110. Generally, crash handler 114 may record stack traces and associated user action information for a crash event and commit the recorded stack traces and associated user action information to crash data repository 140. As discussed in further detail below, crash report comparator 122 in development environment 120 can use the information in crash data repository 140 in identifying similar crash events and taking one or more actions based on the identification of these similar crash events. Generally, crash handler 114 may record handled exceptions (which may allow for an application to fail in a controlled manner or allow for continued execution of the application) and unhandled exceptions (which may cause an application to fail in an uncontrolled manner) differently.

For handled exceptions, crash handler 114 may record information such as the name of the module in which the crash event occurred, the file name associated with the module in which the crash event occurred, the name of the function that was executing when the crash event occurred, the line of code at which the crash event occurred, and the like. For unhandled exceptions, crash handler 114 may record information such as the contents of a memory stack at the time at which the crash event occurred, the name of the module in which the crash event occurred, an exception description, and the like.

Model training system 120 is generally representative of one or more physical or virtual computing devices on which an application-agnostic machine learning model can be trained in order to analyze crash reports from one of a plurality of software applications. As illustrated, model training system 120 includes a multidimensional space mapping generator 122 and a similarity model trainer 124.

Multidimensional space mapping generator 122 generally uses information about the modules, classes, functions, and other components in a software application to generate a mapping between application-specific information and a multidimensional space (or a "crash embedding") that can be used by an application-agnostic machine learning model (as discussed in further detail below) to classify crash reports and identify similarities between crash reports. In some aspects, the multidimensional space may be a numerical space in which modules, classes, functions, and the like can be mapped, and each software application for which crash reports may be analyzed may be associated with a different multidimensional space.

The multidimensional space mapping generator 122 may assign different values to each unique combination of module, class, and function included in a software application. For example, values in the multidimensional space may be a 3-tuple including a first unique alphanumeric identifier for the module identified in a stack frame, a second unique alphanumeric identifier for the class identified in the stack frame, and a third unique alphanumeric identifier for the function identified in the stack frame. Suppose, as an example, that an application includes three modules, each with up to nine classes, and up to ninety-nine functions in each class. Each value in the 3-tuple may thus include 4 digits, with the first digit corresponding to a module, the second digit corresponding to a class, and the last two digits corresponding to a specific function. The first value in the 3-tuple may map to the module identified in a stack frame of a crash report and may have a value in the first digit associated with that module and all other digits set to zero. Thus, for the first value in the 3-tuple, a first module may map to a value of 1000, a second module may map to a value of 2000, and so on.

The second value in the 3-tuple may identify both the module specified in a crash report and a class in the specified module. In the example discussed above, each class may be mapped to a unique value for the second digit of a four-digit unique identifier in the multidimensional space. Thus, for the first module (mapped to a value of 1000 for the first value in the 3-tuple), a first class may be mapped to a value of 1100, a second class may be mapped to a value of 1200, a third class may be mapped to a value of 1300, and so on. Similarly, for the second module (mapped to a value of 2000 for the first value in the 3-tuple), a first class may be mapped to a value of 2100, a second class may be mapped to a value of 2200, a third class may be mapped to a value of 2300, and so on.

The third value in the 3-tuple may identify the module specified in a crash report, a class in the specified module, and a function in the class specified in the crash report. In the example discussed above, each function may be mapped to a unique two-digit value for the third and fourth digits of a four-digit unique identifier in the multidimensional space. Thus, for a first class in the first module, the first function of the first class may be mapped to a value of 1101, the second function of the first class may be mapped to a value of 1102, and so on. For a second class in the first module, the first function of the second class may be mapped to a value of 1201, the second function of the second class may be mapped to a value of 1202, and so on.

Multidimensional space mapping generator 122 can use, for example, natural language processing (NLP) techniques, through natural language processing engine 123, to generate an application-specific mapping of modules, classes, and functions to points in a multidimensional space. In one example, the multidimensional space mapping generator 122 can take, as input, a plurality of header files associated with code for an application. The header files can identify a module containing classes specified by the header files, as well as definitions of functions (both public scoped and private scoped) implemented by each class. In some aspects, the NLP techniques used by multidimensional space mapping generator 122 may be implemented as a machine learning model trained to identify clusters, or groups, of similar content using unsupervised learning techniques. Each combination of module, class, and function can thus be clustered into one or more groups with an arbitrarily determined value representing the mapping to assign to the combination of module, class, and function.

Model trainer 124 is generally configured to train an application-agnostic machine learning model to classify crash reports from a plurality of applications. The application-agnostic machine learning model generally uses points in a multidimensional space corresponding to each of a plurality of stack frames in a crash report as an input into a first machine learning model, which generates a latent space representation of the crash report. The latent space representation of the crash report may then be classified using a second machine learning model, as discussed in further detail below. As discussed herein, the same application-agnostic machine learning model may be used across different applications without needing to be retrained for any specific application for which the application-agnostic model is used to classify crash reports.

Generally, model trainer 124 can train the application-agnostic machine learning model as a first machine learning model trained to generate a latent space representation of a crash report and a second machine learning model trained to classify the latent space representation generated by the first machine learning model. The first machine learning model may be trained to generate the latent space representation of the crash report based on an input of a set of stack frames in a crash report and a mapping of stack frame content to a multidimensional space (e.g., the mapping generated by multidimensional space mapping generator 122). Generally, to train the first machine learning model, a training data set of stack traces and the associated mappings (crash embeddings) may be input, and the first machine learning model may be trained to output a set of points in a multidimensional latent space, where each point corresponds to a particular stack frame in a stack trace. The second machine learning model may be trained to map each crash report in a set of crash reports to one of a plurality of groups based on the latent space representation of the crash report. Generally, the second machine learning model may be trained based on a collection of [stack frame, latent space encodings] to output an assignment of a category or class for the collection of stack frames (which generally may correspond to a stack trace).

The first machine learning model may be, in some aspects, a recurrent neural network, which is a neural network that allows for the outputs of previous layers to be used as the inputs to other layers. Using a recurrent neural network to generate a latent space representation of a crash report may allow for highly dimensional data to be mapped to a latent space, as recurrent neural networks, and the connections between neurons in the recurrent neural networks, may be amenable to handling large data sets such as the contents of a crash report. To train the first machine learning model, model trainer 124 can use a data set of crash reports from a software application and a mapping of functions in the software application to a multidimensional space as an input. In some aspects, the data set of crash reports may be transformed into data formatted according to the mapping of functions to the multidimensional space so that the first machine learning model is trained on multidimensional numerical data representing the data in these crash reports without being closely coupled to the specific implementation details of the application from which the crash reports were generated. That is, instead of training the first neural network using module names, function names, and other application-specific constructs, model trainer 124 can train the first neural network based on genericized numerical data that is decoupled from the implementation details of any given application. By doing so, the first machine learning model may be trained to map crash reports from any application into a latent space.

In some aspects, the first machine learning model may be trained using an auxiliary neuron as an input into the first machine learning model. The auxiliary neuron may be a neuron (or other data processing construct) that is configured to convert stack frames in a crash report into data in the multi-dimensional space (which, as discussed, may be a numerical space in which different modules and functions in the software application are mapped to different portions of the multi-dimensional space). Stack frames included in a crash report may be input into the auxiliary neuron, and the auxiliary neuron may map each stack frame included in the crash report to an isolated spatial region in the multi-dimensional space. The auxiliary neuron may be specific to each application for which crash reports are to be analyzed so that stack frames in a crash report are mapped to an application-agnostic multidimensional space. By doing so, the auxiliary neuron may provide application-agnostic data into the first machine learning model so that the first machine learning model can map crash reports from any application into a latent space representation of these crash reports.

The second machine learning model may also be a recurrent neural network. Generally, the second machine learning model may be trained using unsupervised learning techniques to group crash reports based on the latent space representations of these crash reports generated by the first machine learning model. The second machine learning model may be trained to assign crash reports to one of a plurality of groups so that, as discussed in further detail below, a crash report comparator 132 in development environment 130 can determine the number of crash reports in each of the groups and determine what actions to take with respect to deploying a software application to a production environment or to manufacturing.

In some aspects, model trainer 124 may further be configured to train a third machine learning model to assign textual descriptions to each group (or classification) of crash reports. The third machine learning model may be trained using supervised learning techniques in which a training data set of a classification may be mapped to a textual description. To train the third machine learning model, a data set of crash reports assigned to a specific group by the second machine learning model may be output for analysis.

The data set of crash reports may include information identifying the group and each of the crash reports included in the data set of crash reports. In some aspects, various natural language processing techniques can be used against each of the crash reports in the data set of crash reports to identify common words or phrases in the crash reports, and these common words or phrases may be used as a label associated with the classification. In another aspect, the label assigned to each group of crash reports may be manually assigned by a developer of the software application based on an analysis of the crash reports included in each group.

Development environment 130 generally is representative of one or more physical or virtual computing devices on which crash events recorded during execution of application 112 on application server 110 may be used to identify similar crash events and control deployment of application source code (and/or the application binaries derived therefrom) to application server 110. As illustrated, development environment 130 includes a crash report comparator 132 and a deployment manager 134.

Crash report comparator 132 generally receives a data set of crash reports for analysis and uses the trained crash report analysis model generated by model trainer 124 to control promotion of application source code from a test environment to a production environment or promotion of application source code to a test environment. Crash report comparator 132 may be invoked, for example, through a graphical user interface in a software development tool (e.g., an integrated development environment) allowing a user of the software development tool to specify the source crash reports for analysis. In some aspects, crash report comparator 132 may be invoked by deployment manager 134 to determine whether application source code is in a stable state for deployment to a production environment on application server 110, as discussed in further detail below.

To analyze a data set of crash reports and determine whether application source code is in a state in which such code can be deployed to a production environment, crash report comparator 132 generates a representation of each crash report in the data set of crash reports using a first neural network and a mapping between functions in the software application and a multidimensional space. As discussed, the mapping between functions in the software application and the multidimensional space may include a predefined mapping or a specification of an auxiliary neuron attached to the first neural network configured to convert stack frames in a crash report to points in an application-agnostic multidimensional space. Generally, the mapping may be predefined or may be generated based on the output of a natural language processing engine, given an input of data specifying the names of modules and functions in a software application being analyzed by the crash report comparator 132. In some aspects, the mapping may comprise tensors defining associations between functions in the software application and the multidimensional space. Each function in the software application may be mapped to a unique point in the multidimensional space. In some aspects, the multidimensional space may include a data point in a first dimension identifying the module in which a function resides, a data point in a second dimension identifying the class in which the function resides, and a data point in a third dimension identifying the function in the class.

As discussed, the first machine learning model 136 is trained to generate a latent space representation of an input crash report. To generate the latent space representation, the first machine learning model uses the representation of the crash report generated by mapping each stack frame in the crash report to a multi-dimensional space. Because the first machine learning model generates latent space representations of input crash reports based on a mapping of modules and functions identified in stack frames to a multidimensional space, the first machine learning model may be configured to generate a latent space representation of a crash report using data that is abstracted from the implementation details of any specific application being analyzed through crash report comparator 132.

The latent space representations of input crash reports generated by the first machine learning model 136 may be input into a second machine learning model 138, and crash report comparator 132 can use the second machine learning model 138 to group the crash reports into a plurality of discrete groups. Each group into which crash report comparator 132 classifies crash reports may be associated with one of a plurality of closely-associated crash reports, such as crash reports originating from particular functions in the software application, crash reports originating from particular modules in the software application, or the like. Crash report comparator 132 can then use the groups of crash reports to determine what actions to perform with respect to the software application.

In some aspects, crash report comparator 132 can examine crash reports in each group of crash reports to determine a number of crash reports included in each group. If the number of crash reports in any group exceeds a threshold number of reports, the crash report comparator 132 can determine that the application source code is not ready to be deployed to a production environment. The threshold may be defined as a raw number of crash reports in any group, as a threshold percentage of crash reports in the data set of crash reports analyzed by crash report comparator 132. If the number of crash reports in each group of crash reports is less than the defined threshold number of reports, crash report comparator can determine that the application source code is ready to be promoted from a test environment to a production environment.

In some aspects, crash report comparator 132 can examine each group of crash reports to identify groups of crash reports that should be flagged to a user of a software development environment. The groups of crash reports flagged to a user of a software development environment generally includes groups of crash reports including numbers of crash reports exceeding a threshold number of crash reports. Information about these groups of crash reports having numbers of reports exceeding the threshold number may be displayed within a graphical user interface in a software development environment.

In some aspects, crash report comparator 132 can use a third neural network to annotate each group of crash reports generated by the second neural network. The third neural network, as discussed, may include a model trained based on defined mappings between groups of crash reports and a textual description describing the crash reports in any given group of crash reports. The textual description with which a group of crash reports is annotated may include, for example, information identifying an application component executing when the crash occurred (e.g., the function at the top of a stack trace, corresponding to the function in which the crash occurred, or the function at the bottom of the stack trace, corresponding to the function which ultimately invoked the operation that failed). In some aspects, the textual description may be a description generated based on commonalities between crash reports included in a group of crash reports.

Deployment manager 134 uses an indication of whether code is ready for promotion from a test environment to a production environment to manage deployment of application 112 on application server 110. If crash report comparator 132 determines that the application source code is ready for promotion from the test environment to the production environment, deployment manager 134 can deploy the application source code from the test environment to the production environment and make the test environment available for use in testing subsequent versions of the software application. In some aspects, to deploy application source code from the test environment to the production environment, deployment manager 134 can re-designate the test environment as the production environment and similarly re-designate the production environment as the test environment.

Otherwise, deployment manager 134 can temporarily block deployment of the software application 112 from the test environment to the production environment. In some aspects, deployment manager 134 may be configured to track groups of crash reports having more than the threshold number of crash reports for use in blocking or releasing a block on deployment of application source code from the test environment to the production environment. The indication of whether application source code is ready for promotion from the test environment to the production environment may include information identifying the number of crash reports in each group. Based on the saved information identifying groups of crash reports having numbers of crash reports exceeding the threshold number of crash reports and the updated information received from crash report comparator 132, deployment manager 134 can release a block and, upon determining that all existing blocks have been released, deploy the application source code to the production environment.

Figure 2:
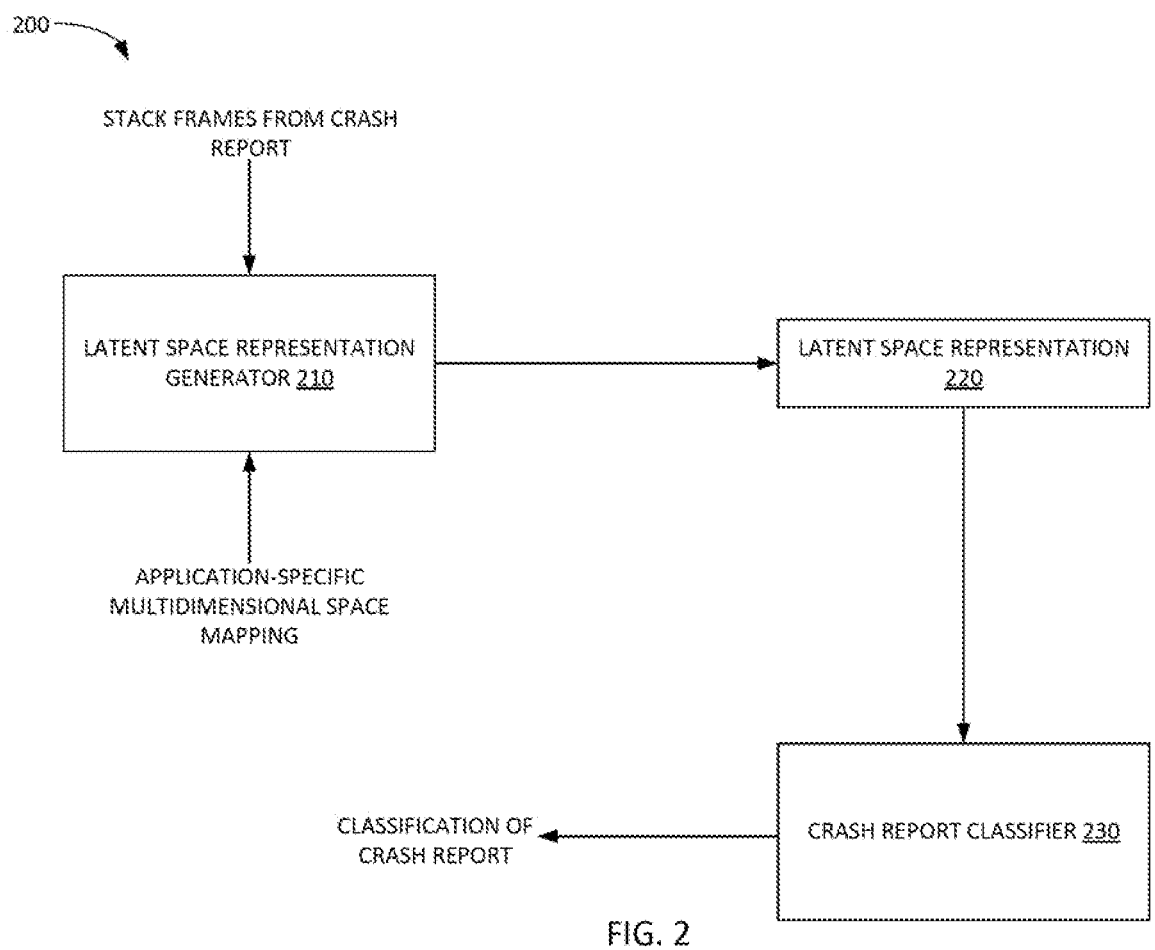
FIG. 2 illustrates an example structure of an application-agnostic machine learning model for classifying crash reports.

Example Application Agnostic Machine Learning Model Architecture for Classifying Crash Reports FIG. 2 illustrates an example architecture 200 of an application-agnostic machine learning model architecture for classifying crash reports. As illustrated, architecture 200 includes a latent space representation generator 210, a latent space representation 220, and a crash report classifier 230. Architecture 200 may be implemented by the first machine learning model 136 and second machine learning model 138 illustrated in FIG. 1.

Latent space representation generator 210 generally corresponds to the first machine learning model discussed above and is generally configured to generate a latent space representation 220 of a crash report. As illustrated, latent space representation generator 210 receives stack frames from a crash report and an application-specific multidimensional space mapping as input. As discussed, the application-specific multidimensional space mapping may include a plurality of tensors defining mappings between modules and functions in a software application and a generic multidimensional space that is decoupled from the specific details of the modules and functions in the software application. In some aspects, the application-specific multidimensional space mapping may include an auxiliary neuron, or other programmatic construct, configured to convert stack frames in a crash report to data in the multidimensional space, and the data in the multidimensional space may be used by latent space representation generator 210 to generate the latent space representation 220 of the crash report received as input into the latent space representation generator 210.

Because latent space representation generator 210 receives an application-specific multidimensional space mapping to use in converting data from an application-specific domain to an application-agnostic domain, latent space representation generator 210 may be configured to generate latent space representations of crash reports from any application without needing to be re-trained for any specific application.

Latent space representation 220 of the crash report generally represents an abstract representation of a crash report generated by latent space representation generator 210. Latent space representation 220 generally is a compressed version of a crash report that retains information about the input crash report in a format that is agnostic to the implementation details of any specific application. The latent space representation 220 generally comprises information in an abstract spatial environment in which similar values in a latent space correspond to similar inputs from which these latent space representations 220 are generated. By using latent space representation 220 of the crash report, highly dimensional data can be compressed into a smaller data set that still retains information usable by crash report classifier 230 to classify a crash report, as discussed in further detail below.

The latent space representation 220 of a crash report generated by latent space representation generator 210 is then input into crash report classifier 230 for classification into one of a plurality of groups. Crash report classifier 230 may generally correspond to the second machine learning model discussed above. Because the latent space representation 220 classified by crash report classifier 230 is generally created from data in a multidimensional space that is decoupled from the implementation details of any application for which crash reports are being analyzed, crash report classifier 230 may classify crashes from any of a plurality of applications without needing to be trained to classify crashes for a specific application.

Example Mapping Between Functions In an Application And a Multidimensional Space Used In Classifying Crash Reports FIG. 3 illustrates an example mapping 300 between functions in an application and a multidimensional space used by the machine learning models discussed herein in classifying crash reports. Generally, a function in a software application may be identified based on the module in which the function is included, the class in which the function is included, and the function itself. As discussed, the mapping 300 between functions in an application and a multidimensional space may be defined a priori or based on an output of a natural language processing engine, given information about the modules, classes, and functions in the application (e.g., from header files including information about the application, from a specification of functions in the application, etc.). As illustrated, each stack frame identified in mapping 300 may identify functions according to the format [module]![class]::[function].

As illustrated, mapping 300 includes mapped points for the module dimension, the class dimension, and the function dimension such that any stackframe is mapped to a 3-tuple of numeric dimensional data representing the module, class, and function identified in the stackframe. The mappings for the module dimension generally includes values for the three unique modules identified in mapping 300: qbtool32, paycore, and PAYUTIL. A unique value for the module dimension may thus be assigned to each module identified in mapping 300. In this example, the qbtool32 module may be mapped to the value 1000, the paycore module may be mapped to the value 2000, and the PAYUTIL module may be mapped to the value 3000.

The mappings for the class dimension generally include a unique value for each class included in any module. Generally, within a given module dimension, the value for each unique class may be a unique value and may include information referencing the parent module (e.g., the most significant digit may be shared between the module dimension and the class dimension, as illustrated in FIG. 3). As illustrated, one class is included in stack frames for the qbtool32 module and for the paycore module, and two classes are included in stack frames for the PAYUTIL module. Thus, in mapping 300, the CSort class in the qbtool32 module may be mapped to the value 1100, the PayrollFormList class in the paycore module may be mapped to the value 2100, the SavedFilingListCtrl class in the PAYUTIL module may be mapped to the value 3100, and the DashPayFormsHistory class in the PAYUTIL module may be mapped to the value 3200.

Similarly, the mappings for the function dimension generally include a unique value for each function included in any class. Generally, the value for each function may be a unique value and may include information referencing the parent module and parent class (e.g., the two most significant digits may be shared between the class dimension and the function dimension, as illustrated in FIG. 3). As illustrated, one function is included in each class, resulting in the values of 1101, 2101, 3101, and 3201 being assigned to the GetComponentID, GetFormInfoByFormID, PopulateSavedFilingVector, and SavedFilingSubFormProc functions, respectively.

Thus, using mapping 300, a function specified in a stack frame of a crash report may be converted from application-specific information to generic points in a multi-dimensional space. By doing so, a machine learning model trained to analyze crash reports may not be tightly bound to any specific application domain, which thus may allow for a machine learning model to be trained once to analyze crash reports from a plurality of applications.

Figure 4:
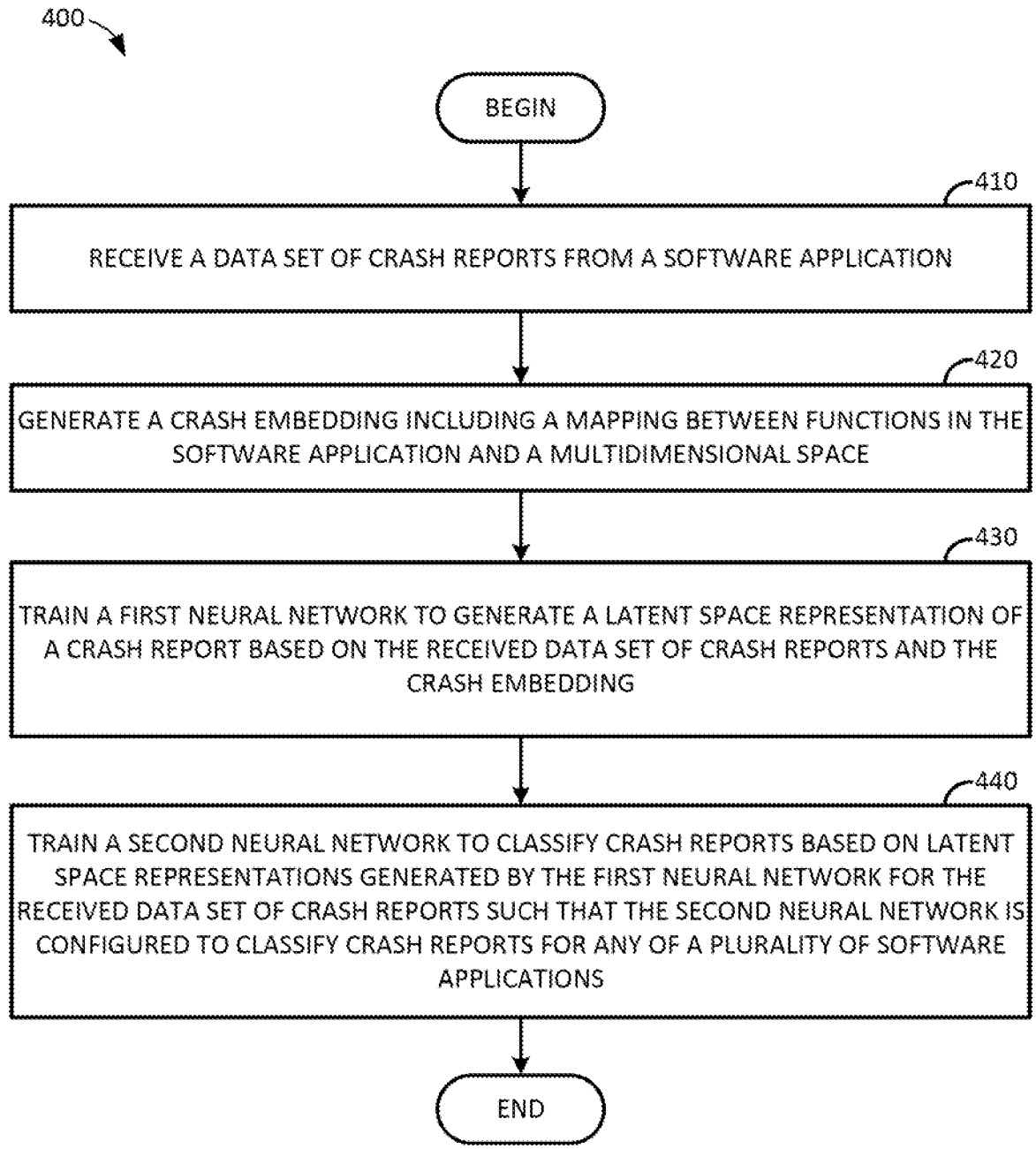
FIG. 4 illustrates example operations for training an application-agnostic machine learning model for classifying crash reports generated during execution of a software application.

Example Computer Implemented Method for Training an Application Agnostic Machine Learning Model for Classifying Crash Reports FIG. 4 illustrates example operations 400 for training an application-agnostic machine learning model to classify crash reports generated during execution of a software application. The operations described herein may be performed, for example, by a model training system executing in a distributed computing environment (e.g., by multidimensional space mapping generator 122 and/or model trainer 124 executing on model training system 120, as illustrated in FIG. 1).

As illustrated, operations 400 begin at block 410, where a data set of crash reports is received from a software application. Each crash report in the data set of crash reports generally includes a stack trace identifying the functions invoked during execution of the software application at the time a crash occurred and the crash report was generated. The stack trace generally includes a plurality of stack frames, and each stack frame generally identifies a module, class, and function executing at the time the crash report was generated.

At block 420, a crash embedding is generated. The crash embedding generally includes a mapping between functions in the software application and a multidimensional space (e.g., as discussed above with respect to multidimensional space mapping generator 122 illustrated in FIG. 1). Generally, the mapping may include some information associating functions in the software application with points in a multidimensional space. In one aspect, the mapping between functions in the software application and a multidimensional space may be generated based on the output of a natural language processing engine for an input of information specifying modules, classes, and functions included in a software application (e.g., header files, lists of modules, classes, and functions, etc.). In another aspect, the mapping may include an auxiliary neuron for a first neural network, and the auxiliary neuron may be a component that converts stack frames in a crash report to points in the multidimensional space. The multidimensional space generally allows for application-specific information to be abstracted into a numeric multidimensional space so that the application-agnostic machine learning models described herein can be trained once to analyze crash reports from a plurality of applications.

At block 430, a first neural network is trained. The first neural network may correspond to latent space representation generator 210 illustrated in FIG. 2 and generally is trained to generate a latent space representation of a crash report based on the received data set of crash reports and the crash embedding. As discussed, the first neural network is trained using inputs of numerical points in the multidimensional space rather than application-specific information (e.g., module, class, and function names unique to a specific application). Because the first neural network is trained using data that is decoupled from any specific application for which crash reports are to be analyzed, the first neural network may generate latent space representations for any of a plurality of software applications. In some aspects, the first neural network may be a recurrent neural network.

At block 440, a second neural network is trained. The second neural network may correspond to crash report classifier 230 illustrated in FIG. 2 and generally is trained to classify crash reports based on latent space representations generated by the first neural network for the received data set of crash reports. As discussed, because the second neural network is trained to group similar latent space representations generated by the first neural network, which in turn are generated based on application-agnostic points in a multi-dimensional space, the second neural network is configured to classify crash reports for any of a plurality of software applications. In some aspects, the second neural network may be a recurrent neural network.

Figure 5:
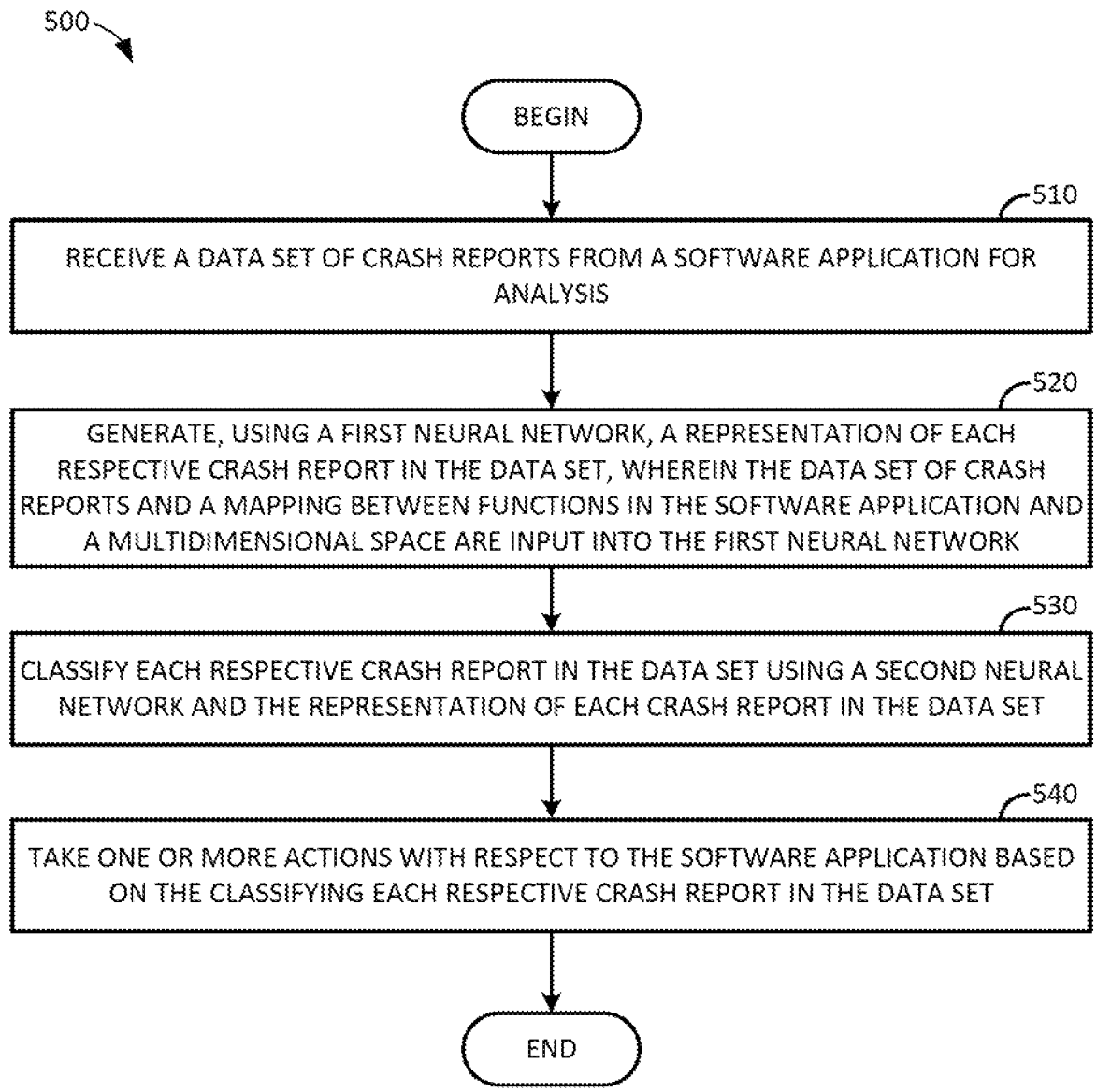
FIG. 5 illustrates example operations for classifying crash reports generated during execution of a software application using an application-agnostic machine learning model and managing deployment of the software application based on classifying the crash reports.

Example Computer-Implemented Method for Application-Specific Crash Report Classification Using Application Agnostic Machine Learning Models FIG. 5 illustrates example operations for classifying crash reports generated during executing of a software application using an application-agnostic machine learning model and managing deployment of the software application based on classifying the crash reports. The operations described herein may be performed, for example, by a crash report comparator and deployment manager executing in a development environment hosted in a distributed computing environment (e.g., by crash report comparator 132 and deployment manager 134 executing in development environment 130, as illustrated in FIG. 1).

Operations 500, as illustrated, begin at 510, where a data set of crash reports is received from a software application for analysis. Each crash report in the data set of crash reports generally includes a stack trace identifying the functions invoked during execution of the software application at the time a crash occurred and the crash report was generated. The stack trace generally includes a plurality of stack frames, and each stack frame generally identifies a module, class, and function executing at the time the crash report was generated.

At 520, a representation of each respective crash report in the data set is generated using a first neural network (e.g., latent space representation generator 210 illustrated in FIG. 2). The data set of crash reports and a mapping between functions in the software application and a multidimensional space are generally input into the first neural network. As discussed, by inputting the data set of crash reports and the mapping between functions in the software application and the multidimensional space into the first neural network, the first neural network may be configured to generate representations of the crash reports based on points in a multidimensional space that are decoupled from the specific implementation details of any given application. In some aspects, the representation of each respective crash report in the data set may include a latent space representation of the crash report generated based on a mapping in the multidimensional space for a module and function identified in each stack frame included in a crash report.

In some aspects, the mapping may include a tensor defining associations between functions in the software application and the multidimensional space.

In some aspects, the mapping may include an auxiliary neuron for the first neural network. Generally, the auxiliary neuron may be a programmatic construct that receives crash reports as input and generates intermediate data for the first neural network to use in generating the representations of the crash reports. The auxiliary neuron generally takes the function identified in each stack frame and converts the contents of the stack frame to a point in a multidimensional space. Different auxiliary neurons, associated with different software applications, may be input into the first neural network so that the same neural networks can be used to classify crashes in different applications.

At 530, each respective crash report in the data set is classified using a second neural network (e.g., crash report classifier 230 illustrated in FIG. 2). The second neural network generally classifies each respective crash report in the data set using the representation generated for the respective crash report by the first neural network.

At 540, one or more actions are taken with respect to the software application based on the classifying each respective crash report in the data set.

In one aspect, to take the one or more actions with respect to the software application, a group of crash reports in the data set associated with one of a plurality of classifications are identified. It is determined that a number of crash reports in the identified group of crash reports exceeds a threshold number of reports. As discussed, the threshold number of reports may be defined as a raw number of reports or a proportion of the total number of reports in the received data set. Based on the determining that the number of crash reports in the group of crash reports exceeds the threshold number of reports, deployment of the software application from a test environment to a production environment may be blocked.

In one aspect, to take the one or more actions with respect to the software application, one or more groups of crash reports in the data having a number of crash reports exceeding a threshold number of crash reports are identified. Each group of the one or more groups is generally associated with one of a plurality of classifications. Within a graphical user interface in a software development environment, information about the one or more groups of crash reports is displayed.

In some aspects, the operation may further include generating the mapping between functions in the software application and the multidimensional space based on output of a natural language processing engine. For example, the natural language processing engine may receive an input of information specifying modules, classes, and functions included in the software application (e.g., header files, lists of modules, classes, and functions, etc.). The output of the natural language processing engine may be data that is decoupled from the specific details of the input specifying modules, classes, and functions included in the software application.

In some aspects, a textual description of a classification may be assigned to each crash report using a third neural network. The third neural network may be a network trained to associate a textual description of a crash, which may be defined a priori or generated based on commonalties between crash reports identified by a natural language processing engine, with each group of crash reports.

In some aspects, the operations 500 may further include receiving a second data set of crash reports from a second software application for analysis. Using the first neural network, a representation of each respective crash report in the second data set is generated. The second data set of crash reports and a mapping between functions in the second software application and a multidimensional space are input into the first neural network. Each respective crash report in the second data set is classified using the second neural network and the representation of each crash report in the second data set. One or more actions are taken with respect to the second software application based on the classifying each respective crash report in the second data set.

Figure 6:
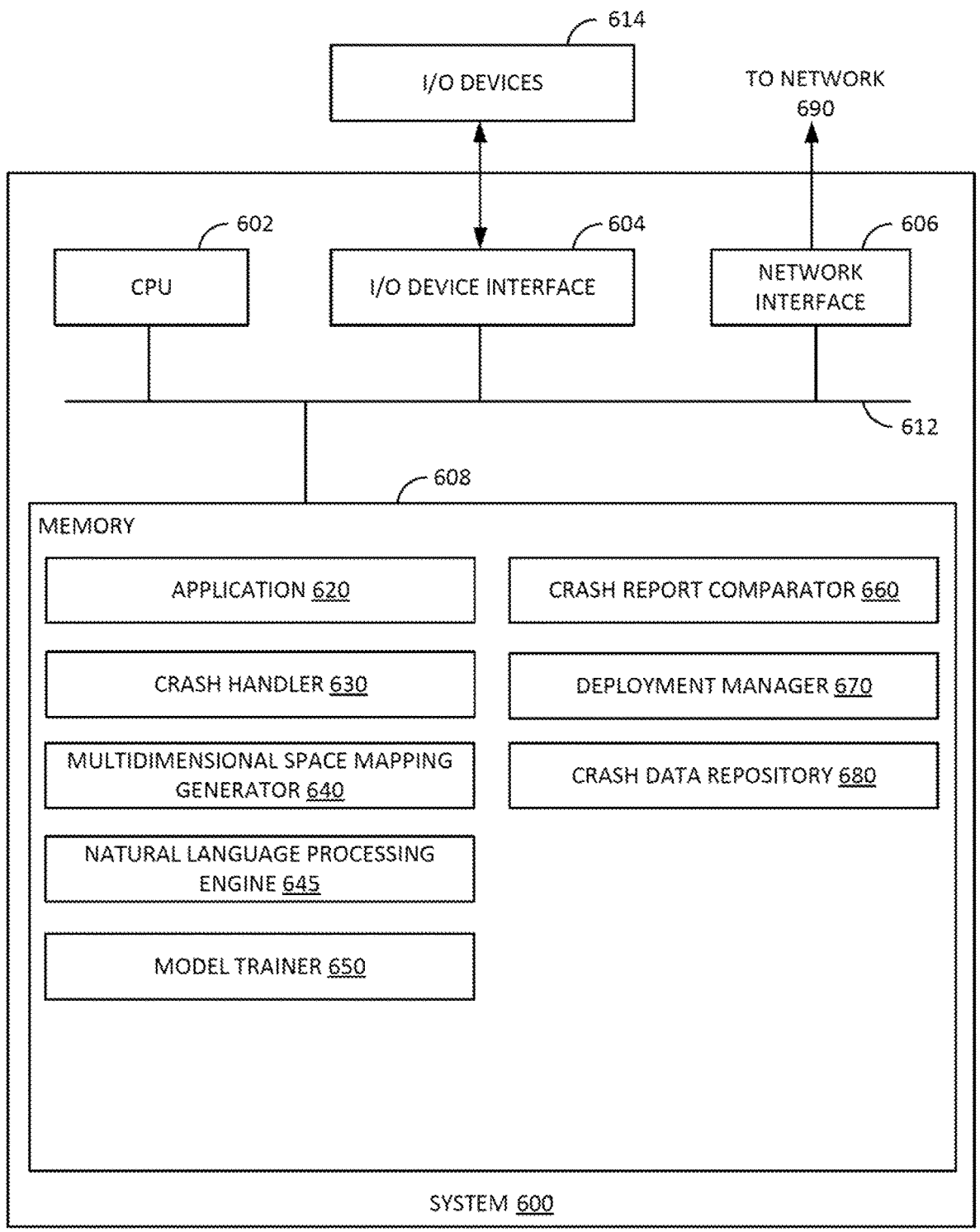
FIG. 6 illustrates an example system on which embodiments of the present disclosure can be performed.

Example System for Application-Specific Crash Report Classification Using Application-Agnostic Machine Learning Models FIG. 6 illustrates an example system 600 that handles crash events based on crash similarity determination based on stack traces and user action sequence information. In one example, system 600 may comprise application server 110, model training system 120, and development environment 130 illustrated in FIG. 1. In another example, where an application executes on a remote computing device (e.g., a mobile phone, tablet, etc.), system 600 may comprise model training system 120 and development environment 130 illustrated in FIG. 1 and need not include application 620 and crash handler 630.

As shown, system 600 includes a central processing unit (CPU) 602, one or more I/O device interfaces 604 that may allow for the connection of various I/O devices 614 (e.g., keyboards, displays, mouse devices, pen input, etc.) to the system 600, network interface 606 through which system 600 is connected to network 690 (which may be a local network, an intranet, the internet, or any other group of computing devices communicatively connected to each other), a memory 608, and an interconnect 612.

CPU 602 may retrieve and execute programming instructions stored in the memory 608. Similarly, the CPU 602 may retrieve and store application data residing in the memory 608. The interconnect 612 transmits programming instructions and application data, among the CPU 602, I/O device interface 604, network interface 604, and memory 608.

CPU 602 is included to be representative of a single CPU, multiple CPUs, a single CPU having multiple processing cores, and the like.

Memory 608 is representative of a volatile memory, such as a random access memory, or a nonvolatile memory, such as nonvolatile random access memory, phase change random access memory, or the like. As shown, memory 608 includes an application 620, crash handler 630, crash report comparator 640, deployment manager 650, and crash data repository 660. Application 620 may correspond to application 112 illustrated in FIG. 1 and generally is representative of an application for which crash reports may be classified by crash report comparator 660 and for which deployment may be managed by deployment manager 670.

Crash handler 630 may correspond to crash handler 114 illustrated in FIG. 1 and generally monitors for the occurrence of handled and unhandled exceptions in application 620. When an exception occurs during execution of application 620, crash handler 630 generates a crash record for a crash event associated with the exception and commits the record of the crash event to crash data repository 680. Generally, the crash record includes a memory dump, which may include a stack trace having a plurality of stack frames, information about user actions performed within the application 620 prior to the exception, and location and description information for the crash event.

Multidimensional space mapping generator 640 may correspond to multidimensional space mapping generator 122 illustrated in FIG. 1 and generally uses information about the functions implemented in a software application to generate a mapping between function names in the application 620 and points in a multidimensional space. Multidimensional space mapping generator 640 can use, for example, natural language processing engines and an input of information specifying module names, class names, and function names for each function in application 620 to identify a point in a multidimensional space to be associated with each unique function implemented in application 620.

Natural language processor 645 may correspond to natural language processor 123 illustrated in FIG. 1. Natural language processor 645 may generally use natural language processing techniques to generate a mapping of application-specific constructs to values in a multidimensional space. These application-specific constructs may include, for example, module names, class names, and function names for each function in application 620.

Model trainer 650 generally trains one or more machine learning models used by crash report comparator 660 to classify crash reports and determine whether application source code is ready for promotion from a test environment to a production environment. Generally, model trainer 650 can train a first neural network to map crash reports to a latent space representation based on an input of a crash report and a mapping between functions in application 620 and a multidimensional space. Model trainer 650 can also train a second neural network to classify crash reports using the latent space representation of the crash reports generated by the first neural network.

Crash report comparator 660 may correspond to crash report comparator 132 illustrated in FIG. 1 and generally receives information specifying a data set of crash reports from crash data repository 680 (which may correspond to crash data repository 140 illustrated in FIG. 1). To classify crash reports, crash report comparator 660 generally inputs the data set of crash reports and a mapping between functions in the application 620 and a multidimensional space (which may be generated by multidimensional space mapping generator 640, as discussed above) into a first neural network to generate a latent space representation of each crash report in the data set. A second neural network generally classifies the crash reports using the latent space representations of the crash reports generated by the first neural network. Generally, crash report comparator 660 can take various actions to manage deployment of application source code to a production environment. For example, crash report comparator 660 can indicate, to deployment manager 670, whether application source code is ready for deployment from a test environment to a production environment and can indicate that source code is blocked from deployment until certain crashes are rectified. In another example, crash report comparator 660 can output information about crash reports in groups of crash reports having a number of reports exceeding a threshold number for display to a user of the system 600.

Deployment manager 670 may correspond to deployment manager 124 illustrated in FIG. 1 and generally represents a software component that controls deployment of application source code from a test environment to a production environment based on a determination by crash report comparator 660 that application source code is ready for deployment to a production environment.

Note that FIG. 6 is just one example of a system, and other systems including fewer, additional, or alternative components are possible consistent with this disclosure.

Example Clauses

Clause 1: A method, comprising: receiving a data set of crash reports from a software application for analysis; generating, using a first neural network, a representation of each respective crash report in the data set, wherein the data set of crash reports and a mapping between functions in the software application and a multidimensional space are input into the first neural network; classifying each respective crash report in the data set using a second neural network and the representation of each crash report in the data set; and taking one or more actions with respect to the software application based on the classifying each respective crash report in the data set.

Clause 2: The method of Clause 1, further comprising generating the mapping between functions in the software application and the multidimensional space based on output of a natural language processing engine.

Clause 3: The method of any one of Clauses 1 or 2, wherein the representation of each respective crash report in the data set comprises a latent space representation of the crash report generated based on a mapping in the multidimensional space for a module and function identified in each stack frame included in a crash report.

Clause 4: The method of any one of Clauses 1 through 3, wherein taking one or more actions with respect to the software application comprises: identifying a group of crash reports in the data set associated with one of a plurality of classifications; determining that a number of crash reports in the group of crash reports exceeds a threshold number of reports; and blocking deployment of the software application from a test environment to a production environment based on the determining that the number of crash reports in the group of crash reports exceeds the threshold number of reports.

Clause 5: The method of any one of Clauses 1 through 4, wherein taking one or more actions with respect to the software application comprises: identifying one or more groups of crash reports in the data set having a number of crash reports exceeding a threshold number of crash reports, each respective group of the one or more groups being associated with one of a plurality of classifications; and displaying, within a graphical user interface in a software development environment, the one or more groups of crash reports.

Clause 6: The method of any one of Clauses 1 through 5, further comprising: assigning a textual description of a classification assigned to each respective crash report using a third neural network.

Clause 7: The method of any one of Clauses 1 through 6, wherein the first neural network and the second neural network comprise recurrent neural networks (RNNs).

Clause 8: The method of any one of Clauses 1 through 7, further comprising: receiving a second data set of crash reports from a second software application for analysis; generating, using the first neural network, a representation of each respective crash report in the second data set, wherein the second data set of crash reports and a mapping between functions in the second software application and a multidimensional space are input into the first neural network; classifying each respective crash report in the second data set using the second neural network and the representation of each crash report in the second data set; and taking one or more actions with respect to the second software application based on the classifying each respective crash report in the second data set.

Clause 9: The method of any one of Clauses 1 through 8, wherein the second neural network comprises a neural network trained to classify crash reports based on numerical vectors in a multidimensional space.

Clause 10: The method of any one of Clauses 1 through 9, wherein the mapping comprises a tensor defining associations between functions in the software application and a multidimensional space.

Clause 11: The method of any one of Clauses 1 through 10, wherein the mapping comprises an auxiliary neuron for the first neural network.

Clause 12: A method, comprising: receiving a data set of crash reports from a software application; generating a mapping between functions in the software application and a multidimensional space; training a first neural network to generate a latent space representation of a crash report based on the received data set of crash reports and the mapping between functions in the software application and the multidimensional space; and training a second neural network to classify crash reports based on latent space representations generated by the first neural network for the received data set of crash reports such that the second neural network is configured to classify crash reports for any of a plurality of software applications.

Clause 13: The method of Clause 12, wherein the first neural network and the second neural network comprise recurrent neural networks.

Clause 14: The method of any one of Clauses 12 or 13, wherein generating the mapping between functions in the software application and the multidimensional space comprises generating a mapping using natural language processing (NLP) techniques.

Clause 15: The method of any one of Clauses 12 through 14, wherein the mapping comprises a tensor defining associations between functions in the software application and a multidimensional space.

Clause 16: The method of any one of Clauses 12 through 15, wherein the mapping comprises an auxiliary neuron for the first neural network.

Clause 17: A system, comprising: a memory having executable instructions stored thereon; and a processor configured to execute the executable instructions to perform the methods of any one of Clauses 1 through 16.

Clause 18: A system, comprising: means for performing the methods of any one of Clauses 1 through 16.

Clause 19: A computer-readable medium having instructions stored thereon which, when executed by a processor, performs the methods of any one of Clauses 1 through 16.

ADDITIONAL CONSIDERATIONS

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:
  receiving a data set of crash reports from a software application for analysis;
  generating, using a first neural network, a representation of each respective crash report in the data set, wherein the data set of crash reports and a mapping between functions in the software application to a multidimensional space are input into the first neural network;
  classifying each respective crash report in the data set using a second neural network and the representation of each crash report in the data set; and
  taking one or more actions with respect to the software application based on the classifying each respective crash report in the data set.

2. The method of claim 1, further comprising generating the mapping between functions in the software application and the multidimensional space based on output of a natural language processing engine.

3. The method of claim 1, wherein the representation of each respective crash report in the data set comprises a latent space representation of the crash report generated based on a mapping in the multidimensional space for a module and a function identified in each stack frame included in a crash report.

4. The method of claim 1, wherein taking one or more actions with respect to the software application comprises:
identifying a group of crash reports in the data set associated with one of a plurality of classifications;
determining that a number of crash reports in the group of crash reports exceeds a threshold number of reports; and
blocking deployment of the software application from a test environment to a production environment based on the determining that the number of crash reports in the group of crash reports exceeds the threshold number of reports.

5. The method of claim 1, wherein taking one or more actions with respect to the software application comprises:
identifying one or more groups of crash reports in the data set having a number of crash reports exceeding a threshold number of crash reports, each respective group of the one or more groups being associated with one of a plurality of classifications; and
displaying, within a graphical user interface in a software development environment, the one or more groups of crash reports.

6. The method of claim 1, further comprising: assigning a textual description of a classification assigned to each respective crash report using a third neural network.

7. The method of claim 1, wherein the first neural network and the second neural network comprise recurrent neural networks (RNNs).

8. The method of claim 1, further comprising:
receiving a second data set of crash reports from a second software application for analysis;
generating, using the first neural network, a representation of each respective crash report in the second data set, wherein the second data set of crash reports and a mapping between functions in the second software application to a multidimensional space are input into the first neural network;
classifying each respective crash report in the second data set using the second neural network and the representation of each crash report in the second data set; and
taking one or more actions with respect to the second software application based on the classifying each respective crash report in the second data set.

9. The method of claim 1, wherein the second neural network comprises a neural network trained to classify crash reports based on numerical vectors in a multidimensional space.

10. The method of claim 1, wherein the mapping comprises a tensor defining associations between functions in the software application and a multidimensional space.

11. The method of claim 1, wherein the mapping comprises an auxiliary neuron for the first neural network.

12. A method, comprising:
receiving a data set of crash reports from a software application;
generating a crash embedding including a mapping between functions in the software application and a multidimensional space;
training a first neural network to generate a latent space representation of a crash report based on the received data set of crash reports and the crash embedding; and
training a second neural network to classify crash reports based on latent space representations generated by the first neural network for the received data set of crash reports such that the second neural network is configured to classify crash reports for any of a plurality of software applications.

13. The method of claim 12, wherein the first neural network and the second neural network comprise recurrent neural networks.

14. The method of claim 12, wherein generating the mapping between functions in the software application and the multidimensional space comprises generating a mapping using natural language processing (NLP) techniques.

15. The method of claim 12, wherein the mapping comprises a tensor defining associations between functions in the software application and a multidimensional space.

16. The method of claim 12, wherein the mapping comprises an auxiliary neuron for the first neural network.

17. A system, comprising:
a memory having executable instructions stored thereon; and
a processor configured to execute the executable instructions to cause the system to:
receive a data set of crash reports from a software application for analysis;
generate, using a first neural network, a representation of each respective crash report in the data set, wherein the data set of crash reports and a mapping between functions in the software application to a multidimensional space are input into the first neural network;
classify each respective crash report in the data set using a second neural network and the representation of each crash report in the data set; and
take one or more actions with respect to the software application based on the classifying each respective crash report in the data set.

18. The system of claim 17, wherein in order to take one or more actions with respect to the software application, the processor is configured to:
identify a group of crash reports in the data set associated with one of a plurality of classifications;
determine that a number of crash reports in the group of crash reports exceeds a threshold number of reports; and
block deployment of the software application from a test environment to a production environment based on the determining that the number of crash reports in the group of crash reports exceeds the threshold number of reports.

19. The system of claim 17, wherein in order to take one or more actions with respect to the software application, the processor is configured to:
identify one or more groups of crash reports in the data set having a number of crash reports exceeding a threshold number of crash reports, each respective group of the one or more groups being associated with one of a plurality of classifications; and
display, within a graphical user interface in a software development environment, the one or more groups of crash reports.

20. The system of claim 17, wherein the processor is further configured to:
receive a second data set of crash reports from a second software application for analysis;
generate, using the first neural network, a representation of each respective crash report in the second data set, wherein the second data set of crash reports and a mapping between functions in the second software application to a multidimensional space are input into the first neural network;

classify each respective crash report in the second data set using the second neural network and the representation of each crash report in the second data set; and take one or more actions with respect to the second software application based on the classifying each respective crash report in the second data set.

\* \* \* \* \*